United States Patent [19]

Lewis

[11] 3,711,570
[45] Jan. 16, 1973

[54] ORGANOPOLYSILOXANE-POLYVINYL CHLORIDE BLENDS

[75] Inventor: Richard Newton Lewis, Tecumseh, Mich.

[73] Assignee: Stauffer-Wacker Silicone Corporation, Adrian, Mich.

[22] Filed: Feb. 10, 1971

[21] Appl. No.: 114,396

Related U.S. Application Data

[63] Continuation-in-part of Ser. No. 861,986, Sept. 29, 1969, abandoned.

[52] U.S. Cl. ........260/827, 117/123 D, 117/132 BS, 117/138.8 A, 117/138.8 F, 117/138.8 UA, 117/138.8 E, 260/18 S, 260/23 XA, 260/37 SB, 260/41 R, 260/41 A, 260/41 B, 260/41 AG
[51] Int. Cl. .....................C08g 47/10, C08f 29/24
[58] Field of Search..........................260/827, 46.5 G

[56] References Cited

UNITED STATES PATENTS

3,464,951  9/1969  Hittmair et al. ..................260/46.5
3,189,576  6/1965  Sweet..................260/46.5
3,318,898  5/1967  Boissieras et al.....................260/46.5
3,417,047  12/1968  Golitz et al. .........................260/46.5
3,555,109  1/1971  Getson ...............................260/46.5

FOREIGN PATENTS OR APPLICATIONS

1,102,393  3/1961  Germany............................260/827
1,012,716  7/1957  Germany............................260/827
957,156  1/1957  Germany............................260/827

Primary Examiner—Samuel H. Blech
Attorney—Marion D. Ford

[57] ABSTRACT

Thixotropic organopolysiloxane compositions comprising a blend of a room-temperature-curable organopolysiloxane and polyvinyl chloride. The organopolysiloxane is characterized by having moisture-reactive groups containing nitrogen, e.g., amino, amido, aminooxy, or oximo groups. These compositions show improved adhesion to various substrates.

8 Claims, No Drawings

ORGANOPOLYSILOXANE-POLYVINYL CHLORIDE BLENDS

This application is a continuation-in-part of copending application Ser. No. 861,986, filed Sept. 29, 1969 and now abandoned.

The present invention is concerned with organopolysiloxane compositions, particularly room-temperature-curable organopolysiloxane compositions containing polyvinyl chloride. More particularly, the invention relates to a thixotropic organopolysiloxane composition comprising a blend of a moisture-reactive nitrogen-containing room-temperature-curable organopolysiloxane and polyvinyl chloride.

Room-temperature-curable organopolysiloxane compositions have found eminent use as sealants and caulking compounds. In order to improve upon their physical properties, for instance tensile strength, elongation, and nonslump properties, various fillers have been added as reinforcing and thixotropic agents. Among the fillers used to improve the properties of the organopolysiloxane compositions are silica, metal soaps, graphites, clays, micas, and organic pigments. Each of these fillers is subject to certain limitations. For example, silica may contain excessive acidity or basicity which destabilizes the organopolysiloxane. Both the graphites and the organic pigments lend an intense color to the organopolysiloxane compositions which in many applications is extremely undesirable. The graphite additionally has a tendency to contain acid; if only a small portion of acid is present, depolymerization and degradation of the organopolysiloxane occurs. The organopolysiloxane compositions formed by using clay fillers tend to harden on aging. The compositions formed from micas and organic pigments are not as desirable as many other organopolysiloxane compositions from the standpoint of bleeding. Furthermore, none of these various fillers will enhance the adhesive characteristics of the composition.

Therefore, it is an object of this invention to provide organopolysiloxane compositions which are thixotropic. Another object of this invention is to provide room-temperature-curable organopolysiloxane compositions which exhibit improved adhesive characteristics. Still another object of this invention is to provide room-temperature-curable organopolysiloxane compositions which have flame-retardant properties. A further object of this invention is to provide uniform blends of room-temperature-curable organopolysiloxanes and polyvinyl chloride.

The foregoing objects and others which will become apparent from the following description are accomplished in accordance with this invention, generally speaking, by incorporating polyvinyl chloride into moisture-curable nitrogen-containing room-temperature-curable organopolysiloxane compositions. The resulting curable compositions are thixotropic and exhibit nonslump properties and improved adhesion to various solid substrates.

I have found that emulsion-grade polyvinyl chloride having an average particle size of from about 0.25 to 20 microns will provide thixotropic compositions with improved adhesion, when incorporated in room-temperature-curable organopolysiloxanes. On the other hand, a suspension-grade polyvinyl chloride in which the particles are larger than 20 microns, when incorporated in a room-temperature-curable organopolysiloxane will not impart thixotropic properties to the composition nor will the composition exhibit improved adhesion to various substrates. In other words, vinyl chloride polymers prepared by the conventional emulsion polymerization process, when mixed with a room-temperature-curable organopolysiloxane, will provide a thixotropic composition which exhibits non-slump properties and improved adhesion to solid substrates in the absence of other reinforcing fillers. These properties are particularly desirable in a so-called "one-component," or "-moisture-curable" composition.

The organopolysiloxane fluids which are blended with the polyvinyl chloride may be represented by the general formula:

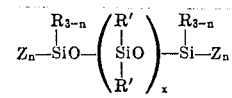

wherein R represents a monovalent hydrocarbon radical; R' represents monovalent hydrocarbon radicals, halogenated monovalent hydrocarbon radicals or cyanoalkyl radicals; Z represents a nitrogen-containing group which is hydrolyzable with atmospheric moisture, such as amino, amido, aminooxy, or oximo radicals; $n$ is a number of from 1 to 3, and has an average value of at least 1.5; and $x$ is a number of from 1 to 10,000.

Radicals represented by R in the above formula are selected from the class consisting of alkyl radicals, e.g., methyl, ethyl, propyl, butyl, hexyl, etc.; alkenyl radicals, e.g., vinyl; or aryl radicals, e.g., phenyl, tolyl, or substituted aryl groups, such as chlorophenyl and the like. Radicals included by R' can be the same or any two or more of the aforementioned radicals; haloalkyl, e.g., trifluoropropyl; haloaryl, e.g., chlorophenyl, dichlorophenyl, etc.; or cyanoalkyl radicals, e.g., cyanoethyl, cyanopropyl, and the like.

The organopolysiloxane compositions of this invention are prepared by contacting a hydroxy-terminal fluid of the composition:

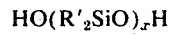

with a silane of the formula:

whereby condensation occurs spontaneously, with the elimination of small molecules of the formula HZ.

The operable hydroxy-terminal fluids are substantially linear polymers having on the average of 1.9 to 2.1 organic radicals per silicon atom and range from relatively low-viscosity fluids to fluids having viscosities up to about 500,000 centipoises, preferably from about 100 to 50,000 centipoises, at 25°C. They may be homopolymers, such as hydroxy-terminal dimethylsiloxanes, copolymers, such as hydroxy-terminal dimethylsiloxane-phenylmethylsiloxane copolymers, or mixtures of polymers.

The Z groups of the silane $R_{3-n}SiZ_{n+1}$ may in principle be any easily hydrolyzable group, including acid-forming groups such as halogen, acyloxy, or phosphato, in which case the by-product HZ is acidic. These acidic by-products are unpleasant and corrosive and it is preferred to use silanes that liberate by-products that are approximately neutral or slightly basic. Accordingly, the Z groups of this invention are the radicals of various nonacidic nitrogen compounds. Suitable Z groups are primary and secondary amino radicals of the formula: R″NH— or R″$_2$N—, in which R″ represents a lower alkyl radical such as methyl, ethyl, propyl, butyl, etc., or a cycloalkyl radical such as cyclopentyl or cyclohexyl; cyclic amino radicals such as pyrrolidino, piperidino, and morpholino radicals; primary and secondary amido radicals such as acetamido, N-methylacetamido, and ureido; cyclic amide radicals such as those derived from pyrrolidone, piperidone, or caprolactam; aminooxy radicals, e.g., diethylaminooxy; and oximo radicals, such as acetoximo, methyl ethyl ketoximo, and cyclohexanonoximo.

Suitable silanes of the formula $R_{3-n}SiZ_{n+1}$ include methyltris(dimethylamino)silane, methyltris(dibutylamino)silane, methyltris(cyclohexylamino)silane, methyltri(morpholino)silane, methyltriacetamidosilane, methyltripyrrolidonosilane, methyltriacetoximosilane, phenyltriacetoximosilane, methyltris(diethylaminooxy)silane, propyltris(diethylaminooxy)silane, tetrakis(diethylaminooxy)silane, and tetrakis(dimethylamino)silane. Minor amounts of a difunctional silane such as dimethylbis(dimethylamino)silane may also be incorporated, but where two or more silanes are used the average value of $n$ should be at least 1.5.

The nitrogen-containing silanes have the unexpected advantage of enhancing the adhesiveness of the composition, especially on metallic surfaces. For this purpose, the aminosilanes are particularly preferred.

The particles or granules of polyvinyl chloride employed in the practice of the present invention have an average diameter of from about 0.25 to about 20 microns and are readily available on the market. The use of such small particles of polyvinyl chloride will provide a thixotropic composition, whereas particle sizes above about 20 microns will not impart thixotropic characteristics to the composition and will in fact settle out rapidly. As mentioned heretofore, the emulsion-grade vinyl chloride polymers having a particle size within the above defined range impart thixotropy to the organopolysiloxane compositions. The polymerization systems utilized in preparing the emulsion-grade polyvinyl chloride are usually based on water-soluble catalysts, such as sodium peroxysulfate, and micelle-forming agents, such as sodium lauryl sulfate or sodium alkylbenzenesulfonate, maintained at a pH of between 6 and 8.

Generally, the polyvinyl chloride is used in the dry state, as a powder, for instance; however, one may employ dispersions of polyvinyl chloride which do not adversely affect the organopolysiloxane functional groups. Examples of suitable dispersing agents are aromatic and aliphatic hydrocarbons, e.g., benzene, toluene, xylene, hexane; halogenated hydrocarbons, e.g., tetrachloroethylene or chlorobenzene; organic ethers, e.g., diethyl ether, dibutyl ether; and esters, e.g., amyl acetate, butyl acetate, butyl acetate, methyl butyrate, and the like.

The amount of polyvinyl chloride employed in the practice of the present invention may be varied within very wide limits and is advantageously within the range of from about 1 to 75 percent, preferably from about 5 to 50 percent. Pastelike, thixotropic, and flame-retardant properties appear when the polyvinyl chloride is present to the extent of 20 percent or more.

The manner whereby the particles of polyvinyl chloride are incorporated in the organopolysiloxane fluid may be widely varied so long as the procedure provides a uniform dispersion of the polyvinyl chloride with the organopolysiloxane fluid. Thus, it is possible to prepare a blend of the organopolysiloxane fluid and particles of polyvinyl chloride polymer by the use of any mechanical mixer. However, it is important to avoid exposure to atmospheric moisture during blending in order to avoid premature curing. It is often desirable to blend the polyvinyl chloride and the hydroxy-terminal fluid first, and add the reactive silane $R_{3-n}SiZ_{n+1}$ under anhydrous conditions just before packaging.

Generally, a catalyst is not necessary in order to obtain a satisfactory cure; however, a catalyst may be incorporated in these compositions in order to accelerate the cure rate. Examples of suitable catalysts are metallic compounds such as tin naphthenate, dibutyltin dilaurate, lead octoate tin octoate, iron stearate, tin oleate, antimony octoate and the like.

The amount of catalyst used in these curing systems may range from about 0.005 to about 2 percent by weight, preferably from about 0.01 to about 1 percent by weight, based on the weight of the composition. A mixture of two or more of the catalysts mentioned above may be used if desired.

Although it is not essential, other fillers may be incorporated in the curable organopolysiloxane compositions to further improve upon a particular physical property for some commercial applications. Examples of suitable fillers are fumed silicas, high-surface-area precipitated silicas, silica aerogels, as well as coarser silicas, such as diatomaceous earth, crushed quartz, and the like. Other fillers which may be used are metallic oxides, such as titanium oxide, ferric oxide, zinc oxide; fibrous fillers, such as asbestos, fibrous glass, and the like. Additives such as pigments, antioxidants, ultraviolet absorbers, and the like, may be included in these compositions.

Curing takes place upon exposure to atmospheric moisture by hydrolysis and condensation. For convenience, the compositions of this invention are best packaged in moisture-proof containers, such as flexible tubes or caulking cartridges. From these they may be applied as needed by extrusion through an orifice under moderate pressure. Because of their good adhesion, they are suitable for both indoor and outdoor sealing and caulking applications. When these compositions are applied to concrete and cured by atmospheric moisture there is no change in strength, adhesion, or appearance on extended exposure to sunlight, rain, freezing or thawing.

In order that those skilled in the art may better understand how the present invention may be practiced, the following examples are given by way of illustration, not by way of limitation. All parts are by weight unless otherwise specified.

EXAMPLE 1 a. An organopolysiloxane composition is prepared by mixing 230 parts of hydroxy-terminated dimethylpolysiloxane having a viscosity of about 20,000 cp. at 25°C. and 190 parts of polyvinyl chloride having an average particle size of from 1 to 2 microns (sold by B.F. Goodrich Chemical Company under the name of Geon-126) in a closed mechanical mixer to form a paste composition.

About 100 parts of the paste composition prepared above is mixed with 5 parts of methyltris(cyclohexylamino)silane under anhydrous conditions and applied to previously cleaned and degreased substrates and cured at room temperature at a relative humidity of from 30 to 70 percent for 7 days. The composition exhibits excellent adhesion to aluminum, stainless steel, ceramic tile, galvanized steel, concrete, Mylar, polystyrene tile, chrome-plated steel, polyethylene, enamel-coated steel, latex-painted concrete block, and polyvinyl chloride film.

b. In a similar example, 100 parts of the hydroxy-terminated dimethylpolysiloxane having a viscosity of about 20,000 cp. at 25°C. is mixed with 5 parts of methyltriacetoxysilane under anhydrous conditions and applied to previously cleaned and degreased substrates. The composition is cured at room temperature at a relative humidity of from 30 to 70 percent for 7 days. The cured composition exhibits little or no adhesion to the following substrates: Mylar, polystyrene tile, chrome-plated steel, polyethylene, enamel-coated steel, latex-painted concrete block, and polyvinyl chloride film.

EXAMPLE 2 a. An organopolysiloxane composition is prepared by mixing 100 parts of hydroxy-terminated dimethylpolysiloxane having a viscosity of about 2,000 cp. at 25°C. and 100 parts of polyvinyl chloride having an average particle size of from 1 to 10 microns (sold by Stauffer Chemical Company as SCC-10) in a conventional mechanical mixer to form a pastelike composition.

About 100 parts of the pastelike composition prepared above is mixed with about 5 parts of methyltris(cyclohexylamino)silane under anhydrous conditions and applied to previously cleaned and degreased substrates. The composition is cured at room temperature at a relative humidity of from 30 to 70 percent for 7 days then immersed in distilled water for 7 days and tested in accordance with the procedure described in Federal Specification TT-S-230a,4.3.9.

b. In a similar example, 100 parts of hydroxy-terminated dimethylpolysiloxane having a viscosity of about 10,000 cp. at 25°C. is mixed with 100 parts of polyvinyl chloride having an average particle size of from 1 to 2 microns. The pastelike composition is mixed with 5 parts of methyltris(cyclohexylamino)silane under anhydrous conditions and applied to previously cleaned and degreased substrates. The composition is cured and tested as in (a).

The results of these examples are shown in Table I.

TABLE I

| Ex. No. | OH-Fluid Parts | Viscosity | PVC Parts | Adhesion in Peel Glass psi | Aluminum psi |
|---|---|---|---|---|---|
| 2(a) | 100 | 2,000 | 100 | 3.4* | 2.1* |
| 2(b) | 100 | 10,000 | 100 | 7.8 | 7.5 |

*Failure from the screen.

EXAMPLE 3

Example 2 is repeated with a 20,000 cp. hydroxy-terminal dimethylpolysiloxane and various amounts of PVC and silane. The results are shown in Table II.

TABLE II

| OH-Fluid Parts | PVC Parts | MTCS Parts | Adhesion in Peel Glass psi | Aluminum psi |
|---|---|---|---|---|
| 80 | 120 | 5 | 2.9$^A$ | 3.8$^A$ |
| 80 | 120 | 10 | 3.4$^A$ | 1.6$^A$ |
| 100 | 100 | 5 | 8.7$^{CA}$ | 13.0$^C$ |
| 100 | 100 | 10 | 7.5$^{CA}$ | 3.5$^A$ |

PVC = polyvinyl chloride
MTCS = methyltris(cyclohexylamino) silane
A = adhesive failure
C = cohesive failure

EXAMPLE 4 a. An organopolysiloxane composition is prepared by mixing 120 parts of hydroxy-terminated dimethylpolysiloxane having a viscosity of about 2,000 cp. at 25°C. and 80 parts of polyvinyl chloride of from 1 to 10 microns (emulsion-grade polyvinyl chloride sold by Stauffer Chemical Company and designated as SCC-10) in a conventional mixer. A pastelike composition is formed which when mixed with about 5 percent by weight of methyltris(diethylamino) silane under anhydrous conditions and then exposed to atmospheric moisture will cure to an elastomer having desirable physical properties.

b. Example 4(a) above is repeated except that 80 parts of a suspension-grade polyvinyl chloride (sold by Stauffer Chemical Company and designated as SCC-558) is substituted for the emulsion-grade polyvinyl chloride designated as SCC-10. Mixing of these ingredients does not form a pastelike composition and as soon as the mixing is discontinued, the composition separates into two phases, an upper phase containing the hydroxy-terminated dimethylpolysiloxane and a lower phase containing the polyvinyl chloride.

EXAMPLE 5

Several organopolysiloxane compositions are prepared, each of which contains 100 parts of hydroxy-terminated dimethylpolysiloxane having a viscosity of about 2,000 cp. at 25°C. and 5 parts of methyltris(cyclohexylamino) silane. To each of the mixtures described above are added varying amounts of polyvinyl chloride and mixed in a closed mixer. Samples are cast into bars (½ × ½ × 6 inches) and cured in air for 24 hours. The self-extinguishing properties of the bars are measured by suspending the cured bars over a Bernzomatic burner having a blue cone approximately 1½ inches long in such a manner that the end of the bar is about one-fourth inch from the tip of the blue cone. The bar is held in the flame for about 20 seconds at which time the flame is removed and the time required for the glow to disappear, "glow-out" time, is measured. The "glow-out" times for the cured bars are given in Table III.

TABLE III

| OH-Fluid parts | PVC parts | "Glow-out" time seconds |
|---|---|---|
| 100 | 11 | 70 |
| 100 | 25 | 37 |
| 100 | 43 | 20 |

EXAMPLE 6

Thixotropic compositions are prepared with 55 parts of 20,000 cp. hydroxy-terminal dimethylpolysiloxane and 45 parts of emulsion-grade PVC as in Example 1, except that the methyltris(cyclohexylamino)silane is replaced by methyltripyrrolidinosilane, methyltrimorpholinosilane, methyltriacetoximosilane, and ethyltris(diethylaminooxy)silane. In each case, the composition is curable by atmospheric moisture, and good adhesion is obtained with all of the substrates listed in Example 1.

Although the present invention has been defined with specific reference to the above examples, it should be understood that these examples are given merely for purpose of illustration. Other variations which will become apparent to those skilled in the art are to be included within the scope of this invention.

The invention claimed is:

1. A room-temperature-curable thixotropic composition comprising a blend of an organopolysiloxane having the formula

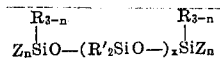
$$Z_nSiO-(R'_2SiO-)_xSiZ_n$$
with $R_{3-n}$ substituents wherein R is a monovalent hydrocarbon radical; R' is selected from the class consisting of monovalent hydrocarbon radicals, halogenated monovalent hydrocarbon radicals, and cyanoalkyl radicals; Z is a functional group selected from the class consisting of amino, amido, aminooxy, and oximo groups; $n$ is a number of from 1 to 3 and has an average value of at least 1.5; $x$ is a number of from 1 to 5,000, and an emulsion grade polyvinyl chloride having an average particle size of less than 20 microns as the sole filler, said polyvinyl chloride being present in an amount of from 1 to 75 percent based on the weight of the composition.

2. The composition of claim 1 wherein Z is an amino group.

3. The composition of claim 2 wherein Z is a cyclohexylamino group and $n$ is 2.

4. The cured composition of claim 1 when exposed to atmospheric moisture.

5. The cured composition of claim 3 when exposed to atmospheric moisture.

6. The composition of claim 1 wherein Z is an aminooxy group.

7. The composition of claim 1 wherein Z is an oximo group.

8. The composition of claim 1 wherein Z is an amido group.

* * * * *